US012126885B2

(12) United States Patent
Jang et al.

(10) Patent No.: US 12,126,885 B2
(45) Date of Patent: Oct. 22, 2024

(54) CAMERA MODULE WITH SENSOR SHIFTING MODULE

(71) Applicant: SAMSUNG ELECTRO-MECHANICS CO., LTD., Suwon-si (KR)

(72) Inventors: Su Bong Jang, Suwon-si (KR); Sang Jong Lee, Suwon-si (KR); Hee Soo Yoon, Suwon-si (KR); Tae Ho Yun, Suwon-si (KR); Ju Ho Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 143 days.

(21) Appl. No.: 17/967,222

(22) Filed: Oct. 17, 2022

(65) Prior Publication Data

US 2023/0156310 A1 May 18, 2023

(30) Foreign Application Priority Data

Nov. 15, 2021 (KR) .................. 10-2021-0156564

(51) Int. Cl.
*H04N 23/68* (2023.01)
*H02K 11/215* (2016.01)
(Continued)

(52) U.S. Cl.
CPC .......... *H04N 23/54* (2023.01); *H02K 11/215* (2016.01); *H02K 41/0354* (2013.01);
(Continued)

(58) Field of Classification Search
CPC ........ H04N 23/54; H04N 23/55; H04N 23/57; H04N 23/6812; H04N 23/687;
(Continued)

(56) References Cited

U.S. PATENT DOCUMENTS 10,863,094 B2 * 12/2020 Sharma .................. G02B 7/08
2020/0314338 A1 * 10/2020 Johnson ................ H04N 23/68
(Continued)

FOREIGN PATENT DOCUMENTS

JP         5453220 B2 * 3/2014
KR  10-2009-0043585 A    5/2009
(Continued)

OTHER PUBLICATIONS

Korean Office Action Issued on Feb. 1, 2023, in Counterpart Korean Patent Application No. 10-2021-0156564 (7 Pages in English, 5 Pages in Korean).

*Primary Examiner* — Lin Ye
*Assistant Examiner* — Chriss S Yoder, III
(74) *Attorney, Agent, or Firm* — NSIP Law

(57) ABSTRACT

A sensor shifting module includes a fixed body; a movable body movably, disposed in the fixed body, comprising an image sensor having an imaging plane oriented in a first direction; a substrate configured to deform based on a movement of the movable body with respect to the fixed body; and a driver, configured to move the movable body in a direction orthogonal to the first direction, comprising a driving coil coupled to one of the fixed body and the movable body, and a driving yoke coupled to another of the fixed body and the movable body. The driving yoke is disposed to oppose the driving coil in the direction orthogonal to the first direction. When current is applied to the driving coil, the movable body is configured to move in the direction orthogonal to the first direction by electromagnetic interaction between the driving coil and the driving yoke.

17 Claims, 18 Drawing Sheets

(51) Int. Cl.
*H02K 41/035* (2006.01)
*H04N 23/54* (2023.01)
(52) U.S. Cl.
CPC ....... *H04N 23/6812* (2023.01); *H04N 23/687* (2023.01); *H02K 2201/18* (2013.01)
(58) Field of Classification Search
CPC .. H02K 11/215; H02K 33/18; H02K 41/0354; H02K 41/0356; H02K 2201/18
See application file for complete search history.

(56) References Cited

U.S. PATENT DOCUMENTS

| | | | |
|---|---|---|---|
| 2021/0028210 A1* | 1/2021 | Okamoto | H01L 27/14618 |
| 2023/0156329 A1* | 5/2023 | Jang | G03B 3/10 |
| | | | 396/55 |

FOREIGN PATENT DOCUMENTS

| | | |
|---|---|---|
| KR | 10-2017-0021682 A | 2/2017 |
| KR | 10-2018-0118720 A | 10/2018 |
| KR | 10-2021-0083154 A | 7/2021 |
| WO | WO 2008/023815 A1 | 2/2008 |
| WO | WO 2017/149092 A9 | 9/2017 |

* cited by examiner

CAMERA MODULE WITH SENSOR SHIFTING MODULE

CROSS-REFERENCE TO RELATED APPLICATION(S)

This application claims the benefit under 35 USC 119(a) of Korean Patent Application No. 10-2021-0156564 filed on Nov. 15, 2021, in the Korean Intellectual Property Office, the entire disclosure of which is incorporated herein by reference for all purposes.

BACKGROUND

1. Field

The following description relates to a method of implementing optical image stabilization by driving an image sensor.

2. Description of Related Art

With the development of communications technology, mobile devices, such as smartphones, have been widely distributed. Accordingly, the demand for the functions of a camera included in mobile devices has also increased. For example, a camera included in a mobile device may be designed to provide advanced imaging functions (e.g., an auto-focus function, an anti-shake function, and the like) implemented in a general DSLR camera despite the small size thereof.

The optical image stabilization function, that is, an optical image stabilization (OIS) function, may be to prevent image blur from occurring when a camera is shaken during the exposure time, and the OIS function may be desired when imaging in a low-light environment in which a camera is shaken and the exposure time is relatively long. The OIS may include digital IS (DIS), electronic IS (EIS), and optical IS (OIS). Among these functions, optical IS (OIS) may fundamentally prevent image deterioration caused by shaking by correcting an optical path by moving a lens or image sensor in a direction orthogonal to the optical axis. Since a mechanical actuator may be desired, it may be complicated to implement as a device, and although relatively expensive, excellent compensation performance may be obtained.

A lens barrel may include an optical system therein, such that a relatively large amount of force may be required to drive the lens barrel. On the other hand, an image sensor may be relatively light and advantageous to implement an excellent OIS function even with a small force. However, when an actuator for driving the image sensor includes a permanent magnet, the magnetic field of the permanent magnet may affect neighboring electronic components. Also, when a mobile device includes a plurality of cameras disposed adjacently to each other, a permanent magnet in each camera may negatively affect the operation of the neighboring cameras, making it functionally difficult to dispose the cameras adjacent to each other or other electronic components in the camera.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a sensor shifting module includes a fixed body; a movable body movably, disposed in the fixed body, comprising an image sensor having an imaging plane oriented in a first direction; a substrate, connecting the movable body to the fixed body, configured to deform based on a movement of the movable body with respect to the fixed body; and a driver, configured to move the movable body in a direction orthogonal to the first direction with respect to the fixed body, comprising a driving coil coupled to one of the fixed body and the movable body, and a driving yoke coupled to another of the fixed body and the movable body. The driving yoke is disposed to oppose the driving coil in the direction orthogonal to the first direction. When current is applied to the driving coil, the movable body is configured to move in the direction orthogonal to the first direction by electromagnetic interaction between the driving coil and the driving yoke.

The driving yoke may be a soft magnetic material.

When no current flows in the driving coil, a magnetic field due to the driving yoke may be zero.

The driving coil and the driving yoke may oppose each other in a second direction orthogonal to the first direction, and electromagnetic interaction between the driving coil and the driving yoke may be configured to move the movable body in the second direction.

The driving coil and the driving yoke may oppose each other in a second direction orthogonal to the first direction. The driving coil may include a first driving coil and a second driving coil disposed on both sides of the movable body in the second direction, respectively. The driving yoke may include a first driving yoke and a second driving yoke opposing the first driving coil and the second driving coil in the second direction, respectively.

The driver may further include a yoke disposed on one side of the driving coil, and the driving coil may be disposed between the driving yoke and the yoke.

The driving coil and the driving yoke may oppose each other in a diagonal direction of the image sensor.

The substrate may include electrical traces connected to the image sensor.

The substrate may include a movable portion fixedly coupled to the movable body, a fixed portion fixedly coupled to the fixed body, and a supporting portion interconnecting the movable portion and the fixed portion to each other. The supporting portion may include a plurality of bridges including the electrical traces embedded therein.

The supporting portion may include a guide, disposed between the movable portion and the fixed portion, connected to the movable portion and the fixed portion through the plurality of bridges.

The plurality of bridges may further include first bridges extending from the movable portion to the guide in a second direction orthogonal to the first direction, and second bridges extending from the guide to the fixed portion in a third direction orthogonal to the first direction. The second direction and the third direction may intersect each other.

The movable body may further include a sensor substrate coupled to the image sensor, the sensor substrate may be disposed on the movable portion, and the sensor substrate and the movable portion may be connected to each other through solder balls at corresponding contact points.

The movable body may further include a sensor holder comprising a plate disposed on an upper side of the sensor substrate and an extension portion extending from an edge of the plate, and the driving coil or the driving yoke may be mounted on the extension portion.

The driver may further include a position sensor disposed on one of the fixed body and the movable body, and a sensing magnet disposed on another of the fixed body and the movable body and opposing the position sensor in the first direction.

In another general aspect, a camera module includes a lens module comprising a lens and a sensor shifting module. The sensor shifting module includes a fixed body; a movable body, movably disposed in the fixed body, comprising an image sensor having an imaging plane oriented in a first direction; a substrate, connecting the movable body to the fixed body, configured to deform based on a movement of the movable body with respect to the fixed body; and a driver, configured to move the movable body in a direction orthogonal to the first direction with respect to the fixed body, comprising a driving coil coupled to one of the fixed body and the movable body, and a driving yoke coupled to another of the fixed body and the movable body. The driving yoke is disposed to oppose the driving coil in the direction orthogonal to the first direction, and a space between the driving yoke and the driving coil is an air gap.

The driving yoke may be a soft magnetic material.

The substrate may include electrical traces connected to the image sensor.

In another general aspect, a sensor shifting module includes: a fixed body; a movable body movably, disposed in the fixed body, comprising an image sensor having an imaging plane oriented in a first direction; a substrate, connecting the movable body to the fixed body, configured to deform based on a movement of the movable body with respect to the fixed body; and drivers configured to move the movable body in orthogonal directions to the first direction, each of the drivers including a driving coil coupled to one of the fixed body and the movable body, and a driving yoke coupled to another of the fixed body and the movable body. A first driver of the drivers and a second driver of the drivers are disposed to oppose each other, and a third driver of the drivers and a fourth driver of the drivers are disposed to oppose each other.

Other features and aspects will be apparent from the following detailed description, the drawings, and the claims.

BRIEF DESCRIPTION OF DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
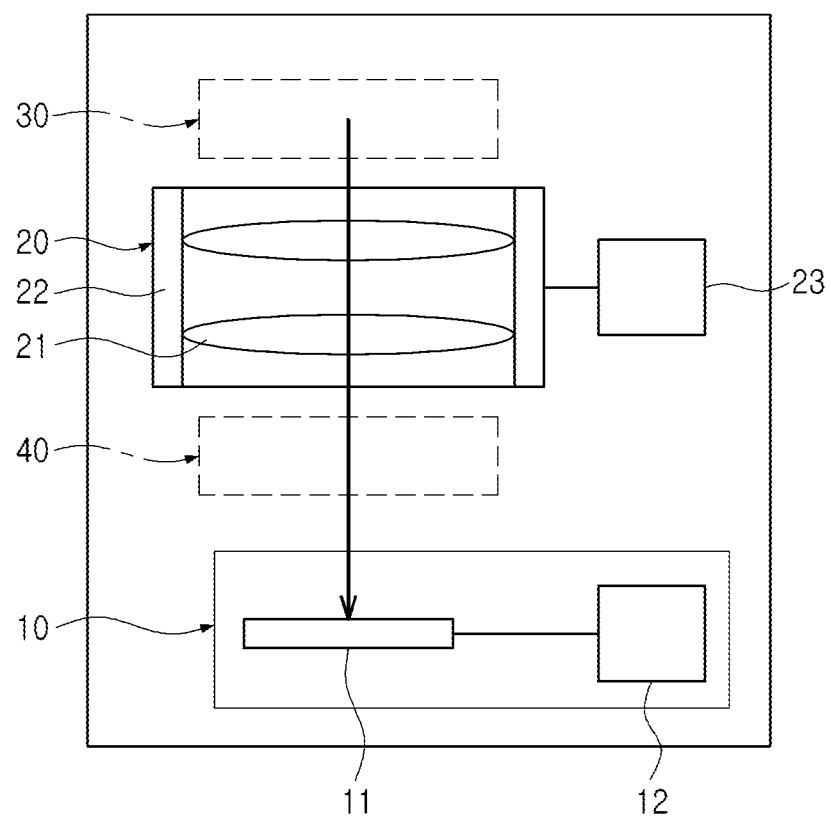
FIG. 1 is a diagram illustrating components included in a camera module according to an example embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below"

or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

In the example embodiments, the X-direction, the Y-direction, and the Z-direction may refer to a direction parallel to the X axis, a direction parallel to the Y axis, and a direction parallel to the Z axis, respectively, in the drawings. Also, unless otherwise indicated, the X-direction may include both the +X-axis direction and the −X-axis direction, which may also apply to the Y-direction and the Z-direction.

In the example embodiments, two directions (or axes) are parallel to or orthogonal to each other may also include the examples in which the two directions (or axes) are substantially parallel to or substantially side by side to each other. For example, the configuration in which the first axis and the second axis are orthogonal to each other may indicate that the first axis and the second axis may form an angle of 90 degrees or approximate to 90 degrees.

"An example embodiment" do not necessarily indicate the same example embodiments. The particular features, structures, or characteristics may be combined in any suitable manner consistent with the example embodiments.

In the example embodiments, "configured to" may indicate that a component may include a structure necessary to implement a function.

An example embodiment of the present disclosure may enable a camera to provide effective optical image stabilization with low power, or to eliminate or reduce an effect of a magnetic field of an actuator for driving an image sensor on electronic components disposed outside a camera.

FIG. 1 is a diagram illustrating components included in a camera module 1 according to an example embodiment.

In an example embodiment, the camera module 1 may include a lens module 20, including at least one lens 21, a lens barrel 22, accommodating at least one lens 21, and an image sensor 11. Light L may pass through the lens module 20 and reach an imaging plane of the image sensor 11. The camera module 1 may include an AF driver 23, which may move the lens module 20 in an optical axis direction to adjust a focal length. The AF driver 23 may include, for example, a coil and a magnet opposing each other. The coil may be fixedly coupled to the lens module 20, the magnet may be coupled to a fixed body such as a housing, and electromagnetic interaction between the coil and the magnet may allow the lens module 20 to move in the optical axis direction.

In an example embodiment, the camera module 1 may provide an optical image stabilization (hereinafter, "OIS") function. The camera module 1 may provide an OIS function by driving the image sensor 11. For example, the camera module 1 may include an OIS driver 12 configured to move the image sensor 11 in a direction orthogonal to the optical axis, or to allow the image sensor 11 to rotate about an axis parallel to the optical axis or to rotate about an axis orthogonal to the optical axis.

In an example embodiment, the camera module 1 may include a sensor shifting module 10. The sensor shifting module 10 may include components necessary to implement the OIS function by driving the image sensor 11. For example, the sensor shifting module 10 may include an image sensor 11 and an OIS driver 12 for driving the image sensor 11. As another example, the sensor shifting module 10 may refer to only the OIS driver 12, excluding the image sensor 11.

In an example embodiment, the camera module 1 may further include an optical element in addition to the lens module 20 and the image sensor 11. In an example embodiment, the camera module 1 may include two or more lens modules. For example, the first optical element 30 and/or the second optical element 40 may be a lens module distinct from the lens module 20.

In an example embodiment, the camera module 1 may include an optical path-changing element disposed in front of the lens module 20. For example, the first optical element 30 may be implemented as a prism or a mirror. In another example embodiment, the optical path changing element may be disposed between the image sensor 11 and the lens module 20. For example, the second optical element 40 may be implemented as a prism or a mirror.

Hereinafter, the sensor shifting module 100 or the OIS driver 120 described with reference to FIGS. 2 to 8 may be applied to the camera module 1 in FIG. 1.

Figure 2:
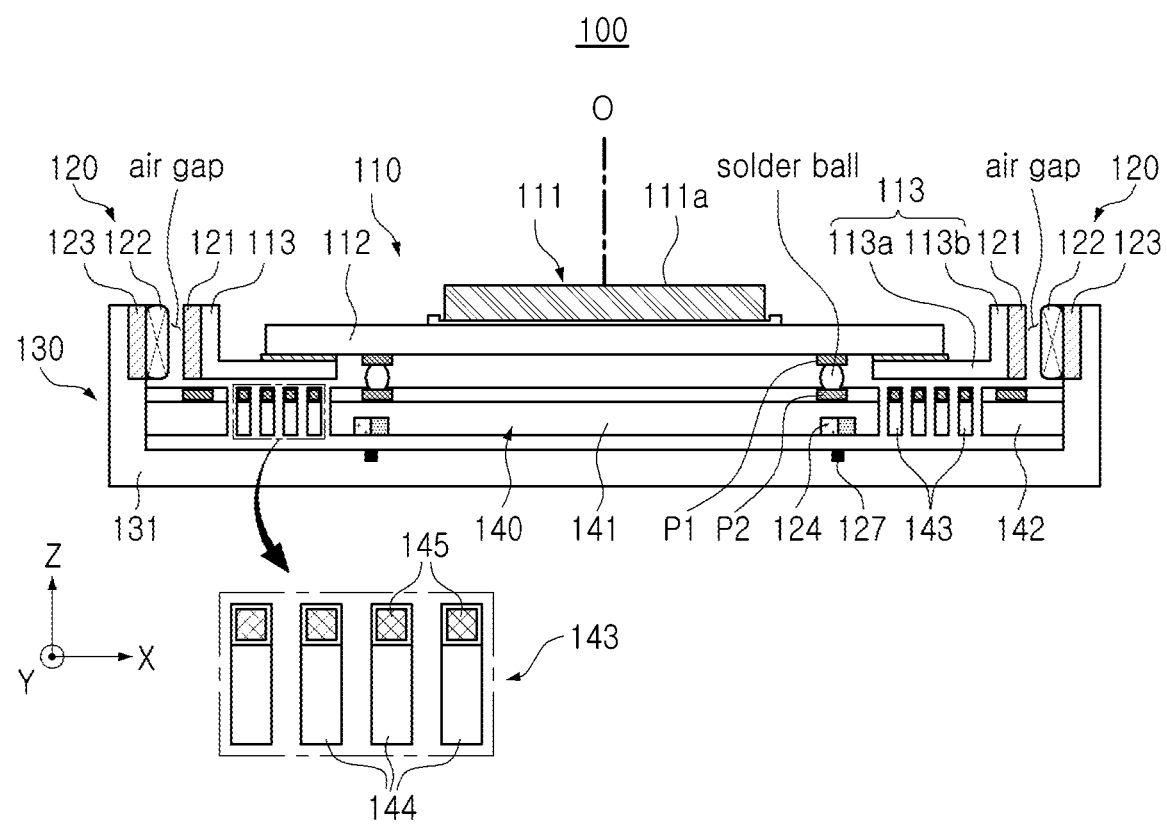
FIG. 2 is a diagram illustrating a sensor shifting module according to an example embodiment of the present disclosure.

FIG. 2 illustrates a sensor shifting module 100 according to an example embodiment. The sensor shifting module 100 may include an OIS driver 120 that drives the image sensor 111. In an example embodiment, the OIS driver 120 may include a movable body 110 and a fixed body 130, including the image sensor 111. The movable body 110 may be movably disposed in the fixed body 130. The movable body 110 may be configured to move together with the image sensor 111. For example, the movable body 110 may include a sensor substrate 112 on which the image sensor 111 is mounted and a sensor holder 113 coupled to the sensor substrate 112.

Referring to FIG. 2, the sensor holder 113 may include a plate 113a connected to the lower portion of the sensor substrate 112, and an extension portion 113b extending upwardly (in the +Z-direction) from the edge of the plate 113a. The extension portion 113b may oppose the driving coil 122, and the driving yoke 121 may be seated on the extension portion 113b. In another example embodiment, the driving yoke 121 may be mounted on the fixed body 130, and the driving coil 122 may be mounted on the sensor holder 113. In this case, the driving coil 122 and/or the yoke 123 may be seated on the extension portion 113b.

A signal of the image sensor 111 may be transmitted to another electronic component (e.g., an image signal processor (ISP)) through the sensor substrate 112 and the connector 150.

The fixed body 130 may include a base 131 and components fixedly coupled to the base 131. For example, the fixed body 130 may include a driving coil 122 and a yoke 123, to be described later.

The movable body 110 may move, through the OIS driver 120, in a direction orthogonal to the direction in which the imaging plane 111a of the image sensor 111 is directed. In an example embodiment, the OIS driver 120 may compensate for the shaking of the camera module 1 or the electronic device on which the image sensor 111 is mounted in a direction orthogonal to the optical axis O. The OIS driver 120 may allow the image sensor 111 to move in a first direction and a second direction orthogonal to the optical axis O. The first direction and the second direction may intersect each other. For example, the OIS driver 120 may allow the movable body 110 to move in the X-direction and/or the Y-direction orthogonal to the Z-axis, thereby compensating for the shaking in the X-direction and/or the Y-direction.

In the example embodiments, the direction in which the imaging plane 111a of the image sensor 111 is directed may be referred to as an optical axis O direction. That is, the second movable body 110 may move in a direction orthogonal to the optical axis O with respect to the first movable body 130. In the drawings, the optical axis O may be parallel to the Z axis; accordingly, the Z-direction may refer to a direction parallel to the optical axis O. Also, the X-direction or the Y-direction may refer to a direction orthogonal to the optical axis O. For example, in the example embodiment, the configuration in which the second movable body 110 moves in the X-direction may indicate that the second movable body 110 may move in a direction orthogonal to the optical axis O. For another example, the configuration in which the driving yoke 121 and the driving coil 122 oppose each other in the X-direction may indicate that the driving yoke 121 and the driving coil 122 oppose each other in a direction orthogonal to the optical axis O. Also, the X-direction or the Y-direction may be an example of two directions orthogonal to the optical axis and intersecting each other, and in the example embodiment, the X-direction and the Y-direction may be configured as two directions orthogonal to the optical axis O and intersecting each other.

In an example embodiment, the sensor shifting module 100 may include a substrate 140 mechanically connecting the movable body 110 to the fixed body 130. The substrate 140 may couple the movable body 110 to the fixed body 130 such that the movable body 110 may move in a direction orthogonal to the optical axis with respect to the fixed body 130. A portion of the substrate 140 may be deformed according to the movement of the movable body 110 with respect to the fixed body 130. That is, a portion of the substrate 140 may be flexible. When the substrate 140 is deformed, a restoring force may be created in the substrate 140, and this restoring force may allow the movable body 110 to return to the original position. The movable body 110 in the equilibrium state may move relative to the fixed body 130 as current is applied to the driving coil 122, and when no current flows in the driving coil 122, the movable body 110 may move back to the original position by the substrate 140.

Figure 3:
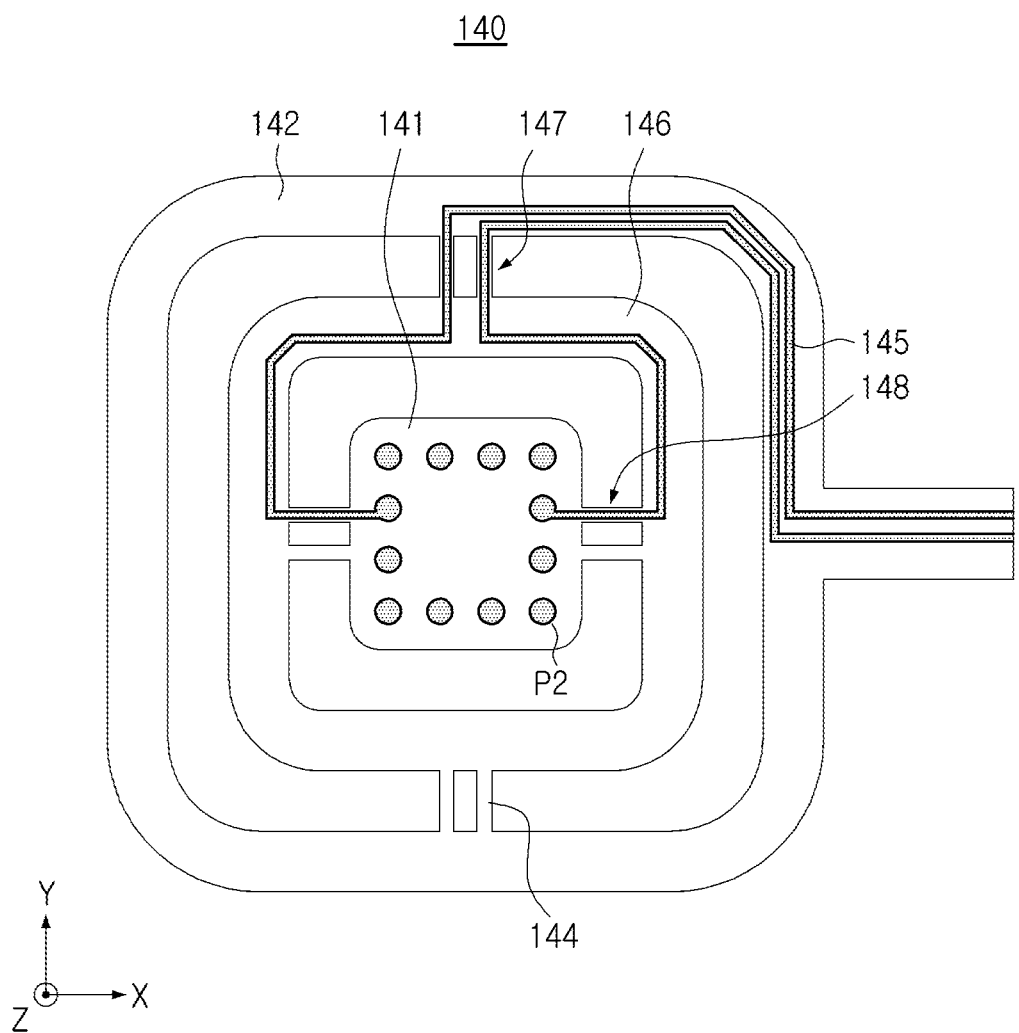
FIG. 3 is a diagram illustrating a substrate on which an image sensor is mounted according to an example embodiment of the present disclosure, viewed from above.

FIG. 3 is a diagram illustrating a substrate 140 on which an image sensor 111 is mounted according to an example embodiment, viewed from above. Referring to FIGS. 2 and 3, the substrate 140 may include a movable portion 141 on which the sensor substrate 112 is seated, and a fixed portion 142 fixed to the fixed body 130. The sensor substrate 112 and the movable portion 141 may be electrically connected to each other at corresponding contact points P1 and P2 through solder balls.

While the movable body 110 (or the image sensor 111) moves relative to the fixed body 130, the movable portion 141 may move relative to the fixed portion 142. The substrate 140 may include a supporting portion 143 connecting the movable portion 141 to the fixed portion 142. At least a portion of the supporting portion 143 may be deformed according to a relative movement between the movable portion 141 and the fixed body 130. For example, the supporting portion 143 may be configured as a flexible substrate. The flexible substrate may be provided in a form in which a conductive pattern (or an electric trace 145) is formed in a film formed of a polyimide material.

In an example embodiment, the substrate 140 may include a plurality of bridge elements 144 connecting the movable portion 141 to the fixed portion 142. The plurality of bridge elements 144 may be included in at least a portion of the supporting portion 143. The plurality of bridge elements 144 may be formed of a flexible material, such that the plurality of bridge elements 144 may be deformed when the movable portion 141 moves relative to the fixed portion 142. When the movable body 110 moves relative to the fixed body 130, the movable portion 141 may move relative to the fixed portion 142, and the bridge elements 144 may be deformed. The restoring force created by the deformation of the bridge elements 144 may allow the movable body 110 or the movable portion 141 to return to the original position. Each of the plurality of bridge elements 144 may include at least one electrical wiring 145. That is, the plurality of bridge elements 144 may electrically and mechanically connect the movable portion 141 (or the movable body 110) to the fixed portion 142 (or the fixed body 130). That is, the bridge elements 144 may support the image sensor 111 and may function as a path for transmitting a signal of the image sensor 111.

In an example embodiment, the substrate 140 may include a guide 146 disposed between the movable portion 141 and the fixed portion 142. For example, the guide 146 may be provided in the form of a picture frame surrounding the movable portion 141. The fixed portion 142, the guide 146, and the movable portion 141 may be connected to each other via the bridge elements 144. For example, the substrate 140 may include a first bridge 147 extending from the movable portion 141 to the guide 146 and a second bridge 148 extending from the guide 146 to the fixed portion 142. The first bridge 147 and the second bridge 148 may extend in a direction orthogonal to the optical axis. The first bridge 147 and the second bridge 148 may extend in a direction intersecting each other. For example, the first bridge 147 may extend in the Y-direction, and the second bridge 148 may extend in the Z-direction.

Each of the first bridge 147 and the second bridge 148 may include one or more bridge elements 144. 3, the first bridge 147 may include four bridge elements 144 extending in the X-direction, and the second bridge 148 may include four bridge elements 144 extending in the Y-direction. The substrate 140 in FIG. 3 may be an example, and the form of the supporting portion 143 connecting the movable portion 141 to the fixed portion 142 may be varied. For example, the supporting portion 143 may include a plurality of bridge elements 144 extending directly from the movable portion 141 to the fixed portion 142. As another example, the first bridge 147 or the second bridge 148 may include five bridge elements 144. The number of bridge elements 144 included in the first bridge 147 or the second bridge 148 may correspond to the number of terminals of the image sensor 111.

The substrate 140 may include an electrical wiring 145 for transmitting a signal of the image sensor 111. A plurality of bridge elements 144 in the supporting portion 143 may include the electrical wiring 145 embedded therein. The image sensor 111 may be mounted on the sensor substrate 112, and the sensor substrate 112 may be electrically connected to the fixed portion 142 of the substrate 140. An electric wiring 145 may extend from each of the contact points P2 formed in the movable portion 141. The electrical wiring 145 may extend to fixed portion 142 through bridge element 144. The electric wiring 145 extending to the fixed portion may be electrically connected to another substrate or electronic component.

Meanwhile, FIG. 3 illustrates the electrical wiring 145 formed on the substrate 140, and only the electrical wiring 145 extending from some contact points is illustrated for ease of description.

Referring to FIG. 2, in an example embodiment, the OIS driver 120 may include a position sensor 127, which may measure how much the movable body 110 moves in a direction orthogonal to the optical axis O. The position sensor 127 may be implemented as a Hall sensor or a magnetoresistance sensor.

The OIS driver 120 may include a sensing magnet 124 moving together with the movable body 110 and opposing the position sensor 127. The position sensor 127 may be disposed to oppose the sensing magnet 124. For example, the position sensor 127 may be disposed on the base 131, and the sensing magnet 124 may be disposed on the substrate to oppose the position sensor 127 in the optical axis direction (in the Z-direction). As another example, the position sensor 127 may be disposed on the substrate, and the sensing magnet 124 may be disposed on the base 131. Two or more of each of the position sensor 127 and the sensing magnet 124 may be provided in pairs.

Referring to FIG. 2, in an example embodiment, the OIS driver 120 may include a driving coil 122 coupled to one of a movable body 110 and a fixed body 130, and a driving yoke 121 coupled to the other of the movable body 110 and the fixed body 130. For example, referring to FIG. 2, in an example embodiment, the driving coil 122 and the driving yoke 121 may be coupled to the base 131 and the sensor holder 113, respectively. The driving yoke 121 and the driving coil 122 may oppose each other in a direction orthogonal to the optical axis O. Electromagnetic interaction between the driving yoke 121, and the driving coil 122 may allow the movable body 110 to move in a direction orthogonal to the optical axis O with respect to the fixed body 130.

In an example embodiment, the OIS driver 120 may further include a yoke 123 disposed on one side of the coil. The yoke 123 may allow the magnetic field created in the coil to be concentrated only in a direction toward the driving yoke 121. Since the yoke 123 is disposed on one side of the driving coil 122, the magnetic field generated by the driving coil 122 may be prevented from affecting the other electronic components or the effect of the magnetic field on the other electronic components may be reduced.

In the example embodiments, the driving coil 122 and the driving yoke 121 may be coupled to the fixed body 130 and the movable body 110, respectively, but an example embodiment thereof is not limited thereto. In another example embodiment, the driving coil 122 and the driving yoke 121 may be coupled to the movable body 110 and the fixed body 130, respectively. For example, the driving coil 122 and the driving yoke 121 may be coupled to the sensor holder 113 and the base 131, respectively.

An air gap may be formed between the driving coil 122 and the driving yoke 121. Alternatively, the space between the driving coil 122 and the driving coil 122 may be an air gap. That is, no other member (e.g., a magnet) may be present between the driving coil 122 and the driving yoke 121. The driving coil 122 and the driving yoke 121 may directly oppose each other with an air gap therebetween.

FIG. 2 illustrates the components of the OIS driver 120, and the example embodiment thereof is not limited to the structure in FIG. 2.

In an example embodiment, the OIS driver 120 may not include a permanent magnet. In an example embodiment, when no current flows in the driving coil 122, the magnetic field caused by the driving yoke 121 may be zero or may have a relatively small level. Accordingly, the magnetic field caused by the first OIS driver 120 may be prevented from affecting the other electronic components (e.g., the other electronic components in the camera module 1, or the electronic components in the other camera module 1) or the effect of the magnetic field on the other electronic components may be reduced.

In an example embodiment, the driving yoke 121 may be a soft magnetic material. A soft magnetic material has a small coercive force and may be magnetized when exposed to a magnetic field, but when the magnetic field disappears, the soft magnetic material may lose magnetism or may have a relatively low level of magnetism.

When current is applied to the driving coil 122, the driving yoke 121 may be magnetized, such that reluctance force may arise between the driving coil 122 and the driving yoke 121. An attractive force may be created in a direction in which the driving yoke 121 and the driving coil 122 oppose each other, which may allow the movable body 110 to move in the corresponding direction with respect to the fixed body 130. For example, referring to FIG. 4, when a current is applied to the first driving coil 122, an attractive force may be created between the first driving coil 122 and the first driving yoke 121, such that the movable body 110 may move in the −X-direction. Conversely, when a current is applied to the second driving coil 122, an attractive force may be created between the second driving coil 122 and the second driving yoke 121, such that the movable body 110 may move in the +X-direction.

Figure 4:
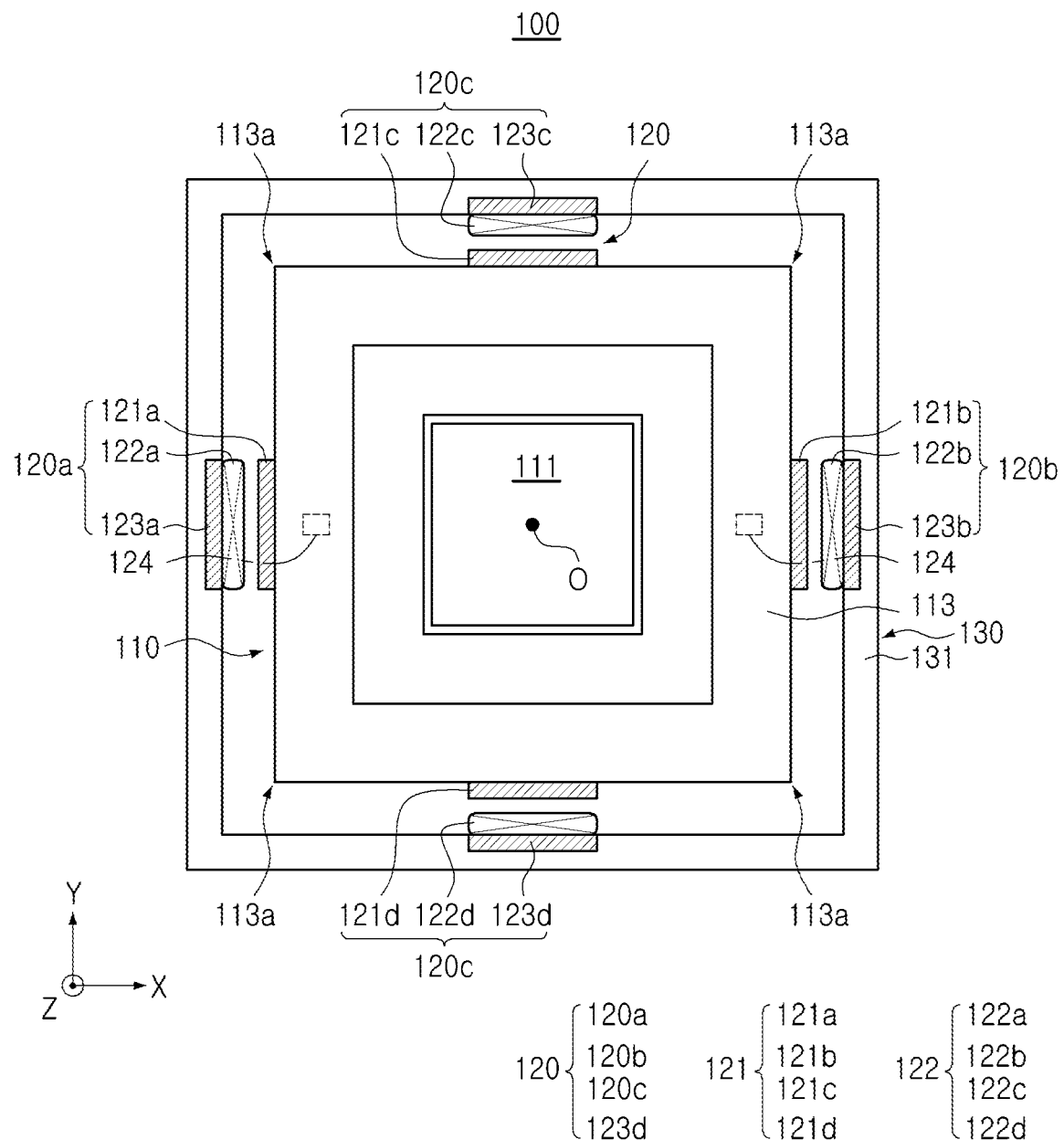
FIG. 4 is a diagram illustrating an OIS driver according to an example embodiment of the present disclosure, viewed from above.

FIG. 4 is a diagram illustrating an OIS driver according to an example embodiment, viewed from above.

The OIS driver 120 may include a plurality of unit drivers 120a, 120b, 120c, and 120d. The unit drivers 120a, 120b, 120c, and 120d may include a driving yoke 121 and a driving coil 122 opposing each other. The unit drivers 120a, 120b, 120c, and 120d may further include a yoke 123 disposed on one side of the driving coil 122. For example, the first unit driver 120a may include a first driving yoke 121a, a first driving coil 122a, and a first yoke 123a.

Since only attractive force may be created between the driving coil 122 and the driving yoke 121, at least two unit drivers may be required to move back and forth the movable body 110 in one direction.

Referring to FIG. 4, the OIS driver 120 may include a first unit driver 120a disposed in the −X-direction of the movable body 110, and a second unit driver 120b disposed in the +X-direction of the movable body 110 to correct the shaking in the X-direction. The first unit driver 120a may include a first driving yoke 121a coupled to the movable body 110 and a first driving coil 122a coupled to the base 131. The first unit driver 120a may further include a first yoke 123a disposed on one side of the first driving coil 122a. The second unit driver 120b may include a second driving yoke 121b coupled to the movable body 110 and a second driving coil 122b coupled to the base 131. The second unit driver 120b may further include a second yoke 123b disposed on one side of the second driving coil 122b.

Referring to FIG. 4, the OIS driver 120 may include a third unit driver 120c disposed in the +Y-direction of the movable body 110, and a second unit driver 120b disposed in the +X-direction of the movable body 110 to correct the shaking in the Y-direction. The third unit driver 120c may include a third driving yoke 121c coupled to the movable body 110 and a third driving coil 122c coupled to the base 131. The third unit driver 120c may further include a third yoke 123c disposed on one side of the third driving coil 122c. The fourth unit driver 120d may include a fourth driving yoke 121d coupled to the movable body 110 and a fourth driving coil 122d coupled to the base 131. The fourth unit driver 120d may further include a fourth yoke 123d disposed on one side of the fourth driving coil 122d.

FIGS. 5A to 5D are diagrams illustrating the movement of a movable body due to the OIS driver in FIG. 4.

Figure 5A:
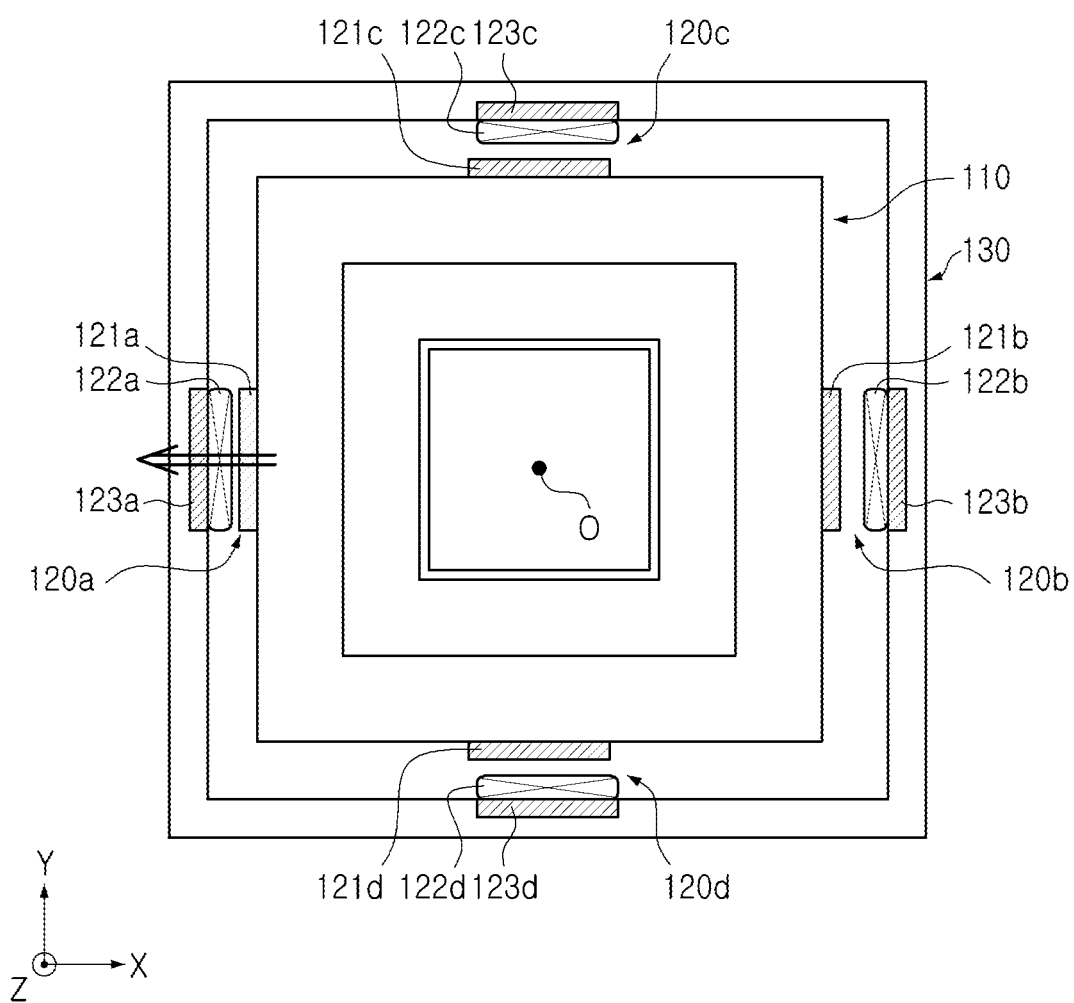
FIGS. 5A to 5D are diagrams illustrating the movement of a movable body due to the OIS driver in FIG. 4.
Figure 5B:
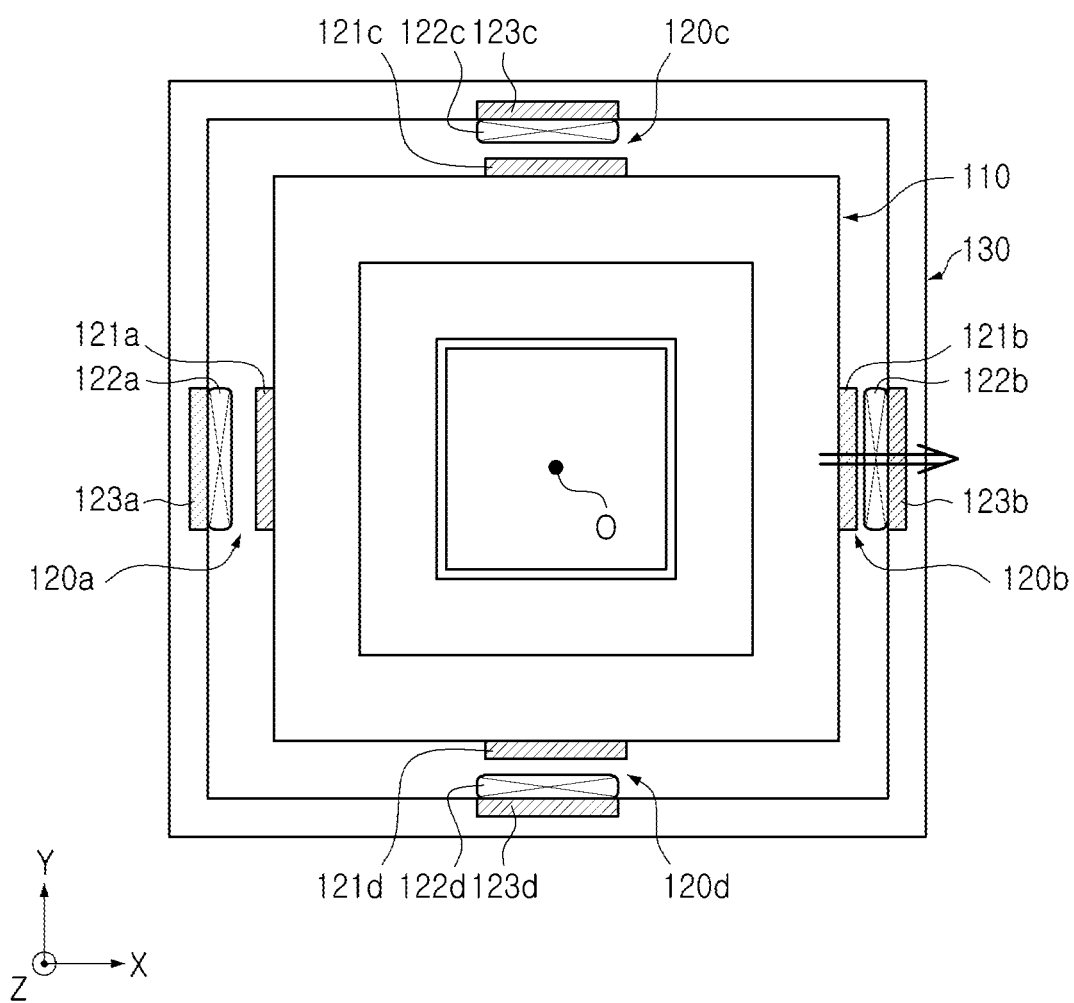
Figure 5C:
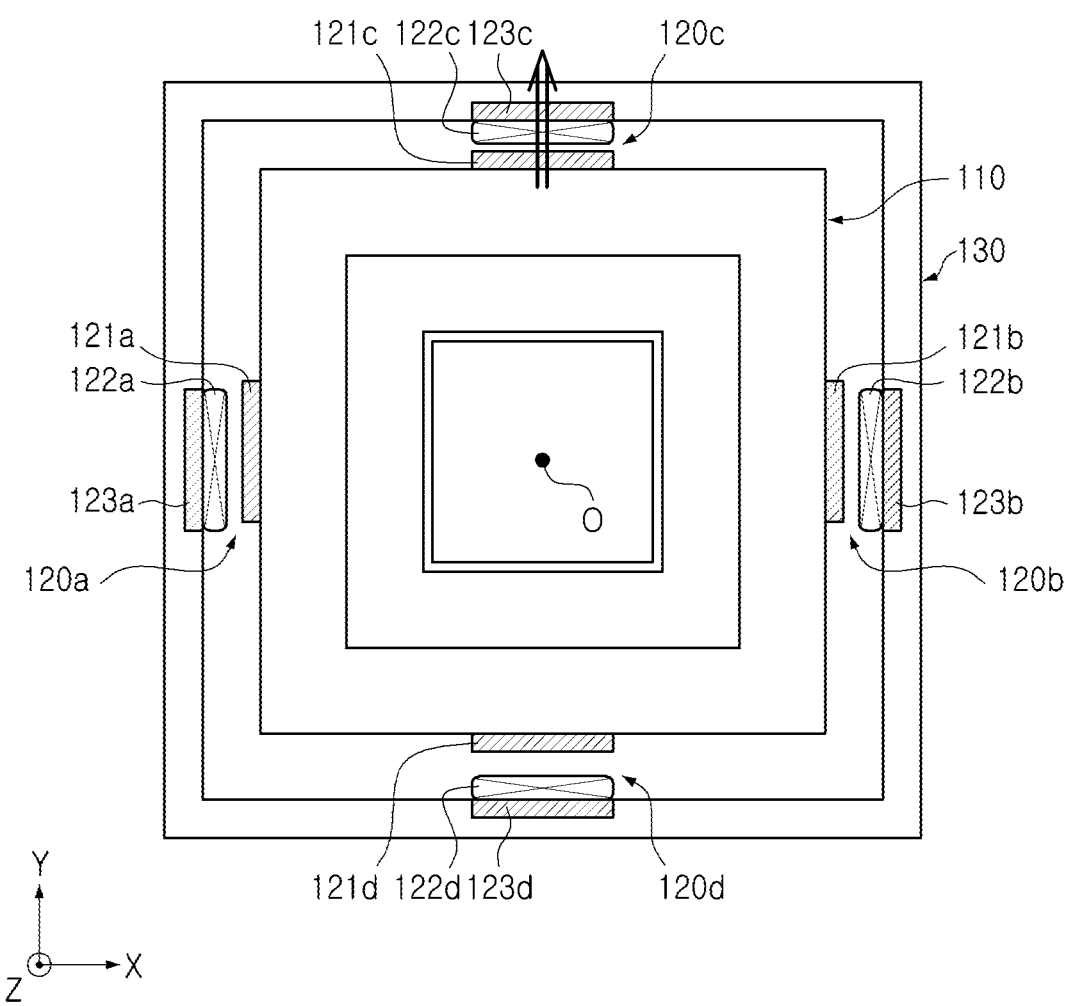
Figure 5D:
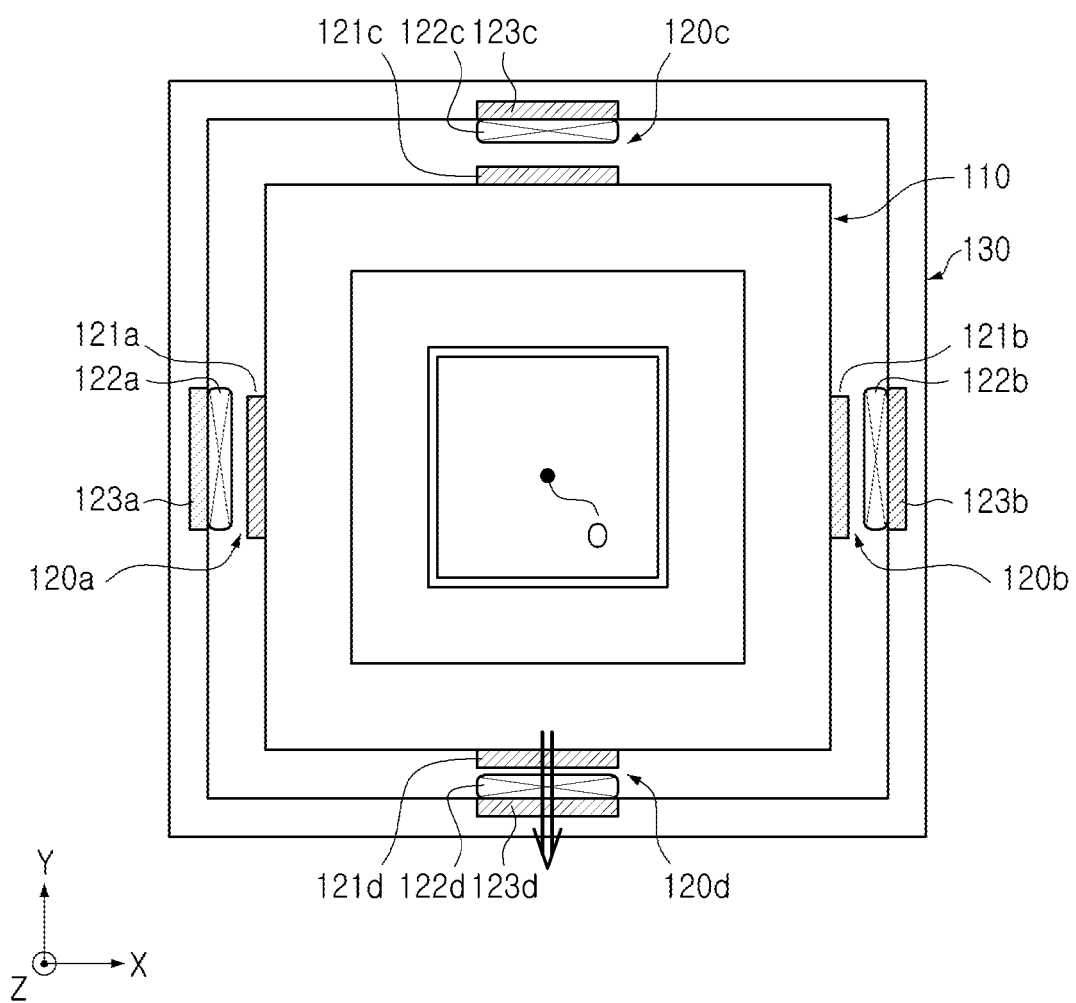

Referring to FIG. 5A, a current may be applied to the first driving coil 122a such that the first driving coil 122a may pull the first driving yoke 121a in the direction of the arrow, and accordingly, the movable body 110 may move in the X-direction. Referring to FIG. 5B, a current may be applied to the second driving coil 122b such that the second driving coil 122b may pull the second driving yoke 121b in the direction of the arrow, and accordingly, the movable body 110 may move in the +X-direction. Referring to FIG. 5C, a current may be applied to the third driving coil 122c such that the third driving coil 122c may pull the third driving yoke 121c in the direction of the arrow, and accordingly, the movable body may move in the +Y-direction. Referring to FIG. 5D, a current may be applied to the fourth driving coil 122d such that the fourth driving coil 122d may pull the fourth driving yoke 121d in the direction of the arrow, and accordingly, the movable body 110 may move in the −Y-direction.

2.4. Diagonal Arrangement

Figure 6:
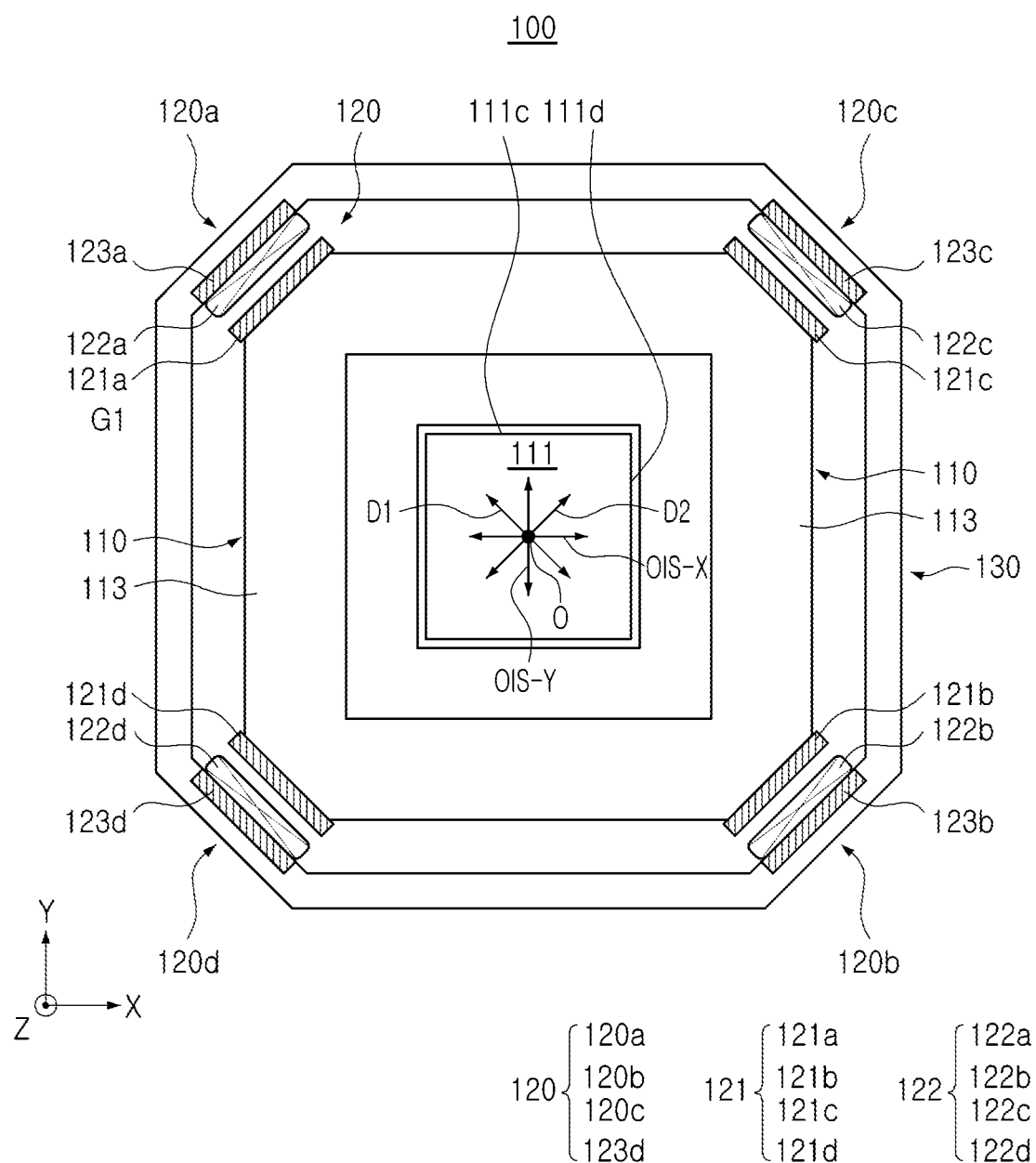
FIG. 6 is a diagram illustrating the example in which unit driving units are disposed in a diagonal direction of a driving direction of an image sensor according to an example embodiment of the present disclosure.

FIG. 6 is a diagram illustrating the example in which unit driving units 120a, 120b, 120c, and 120d are disposed in a diagonal direction of a driving direction of an image sensor 111 according to an example embodiment.

In an example embodiment, the movable body 110 may move in orthogonal directions to the optical axis. For example, the movable body 110 may move in the X and Y directions. The OIS driver 120 may allow the movable body 110 to move in a first direction OIS-X parallel to the horizontal side 111c of the image sensor 111 and a second direction OIS-Y parallel to the vertical side 111d of the image sensor 111.

Referring to FIG. 6, the unit drivers 120a, 120b, 120c, and 120d may be disposed in a direction perpendicular to the optical axis O and intersecting two movement directions, OIS-X and OIS-Y, perpendicular to each other. For example, the first unit driver 120a and the second unit driver 120b may be disposed on both sides of the image sensor 111 in the first diagonal direction D1. The third unit driver 120c and the fourth unit driver 120d may be disposed on both sides of the image sensor 111 in the second diagonal direction D2.

In an example embodiment, when the OIS driver 120 is configured to move the movable body 110 in the first direction OIS-X and the second direction OIS-Y, the driving coil 122 and the driving yoke 121 may oppose each other in a direction between the first direction OIS-X and the second direction OIS-Y. For example, when the OIS driver 120 is configured to move the movable body 110 in the X-direction and the Y-direction, the driving coil 122 and the driving yoke 121 may oppose each other in directions D1 and D2, forming an angle of 45 degrees with the X-axis or the Y-axis.

FIGS. 7A to 7D are diagrams illustrating the movement of a movable body due to the OIS driving unit in FIG. 6.

Figure 7A:
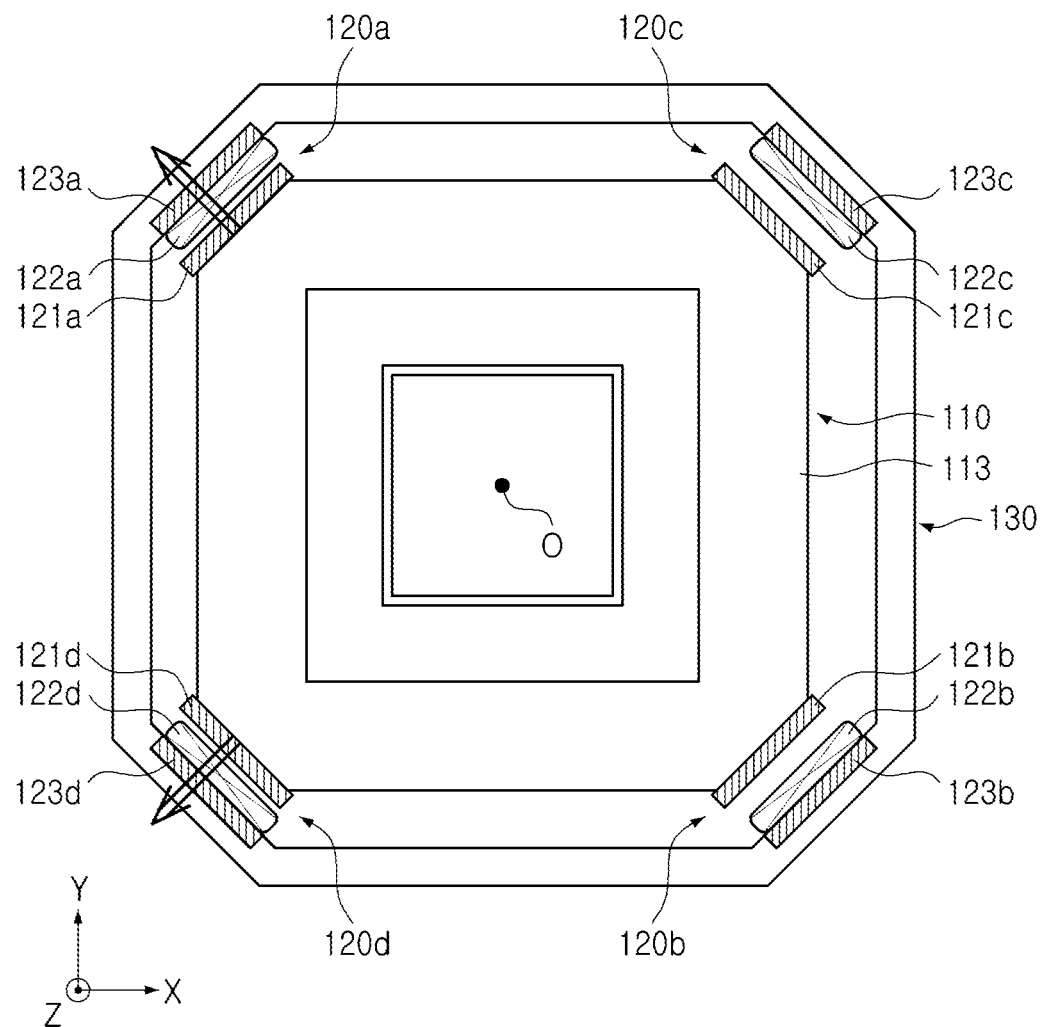
FIGS. 7A to 7D are diagrams illustrating the movement of a movable body due to the OIS driving unit in FIG. 6.
Figure 7B:
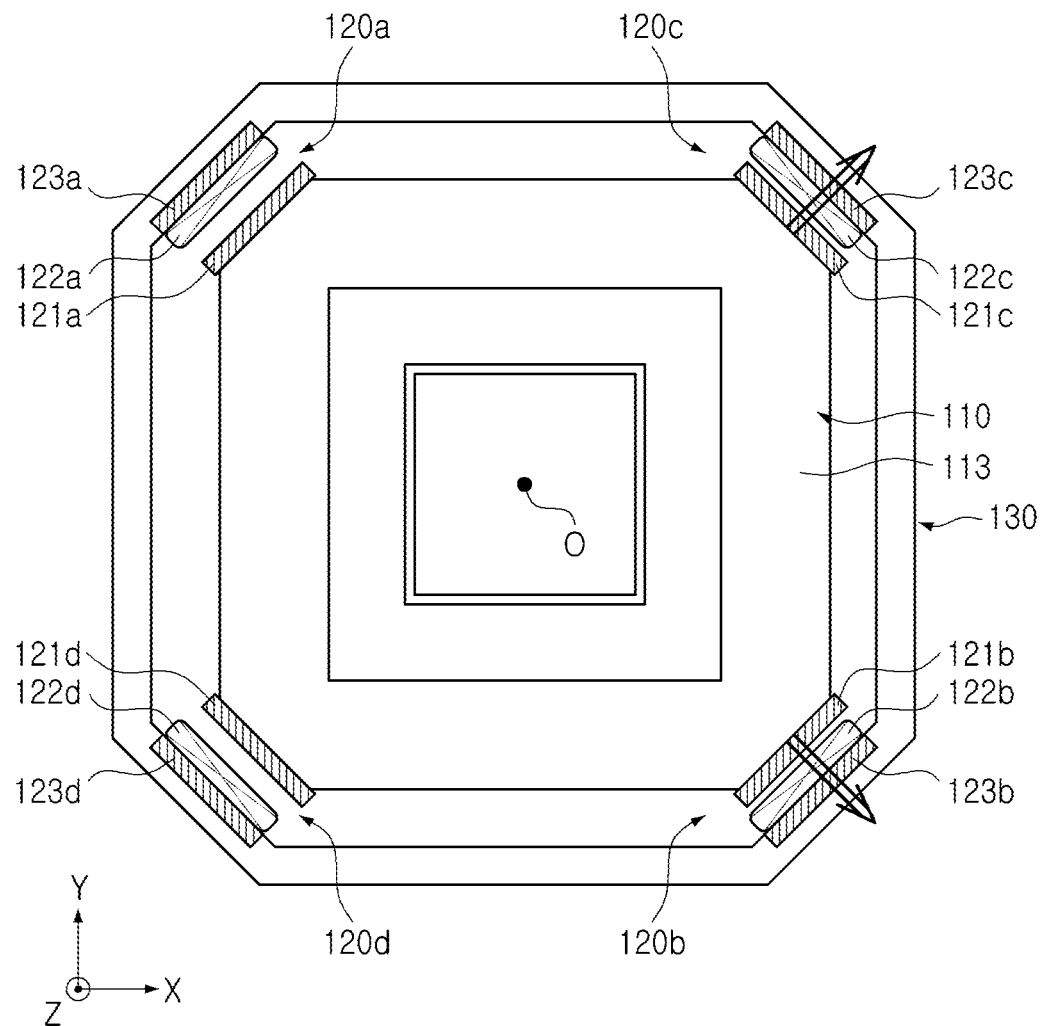
Figure 7C:
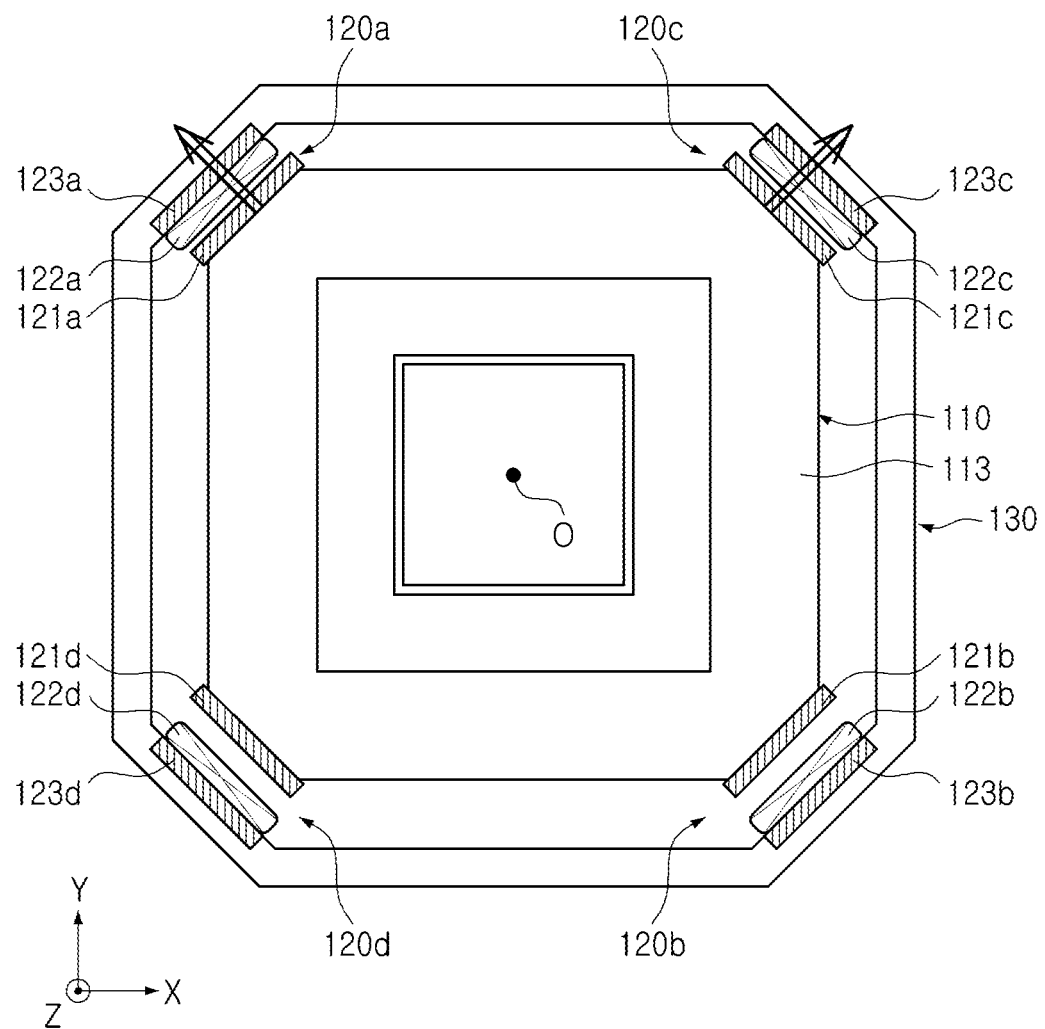
Figure 7D:
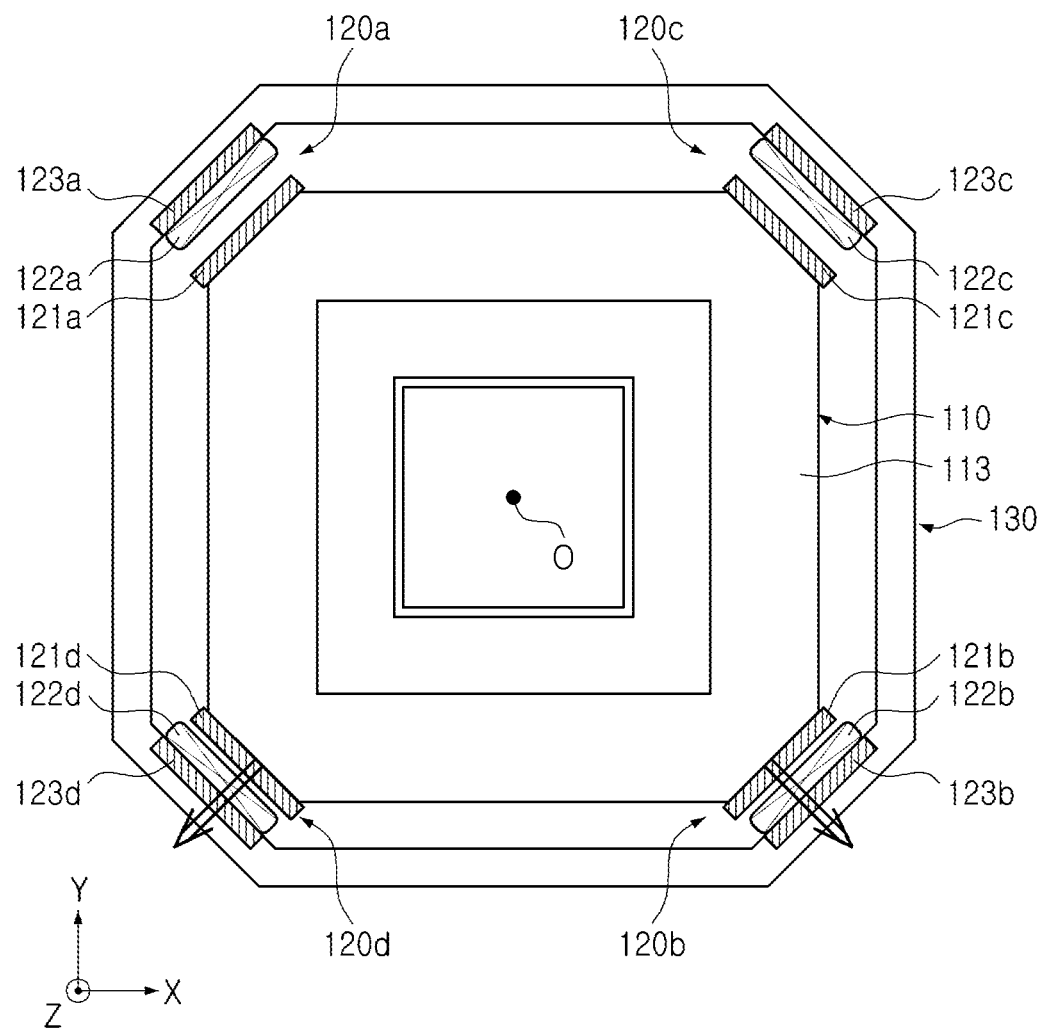

Referring to FIG. 7A, a current may be applied to the first driving coil 122a and the fourth driving coil 122d such that the first driving coil 122a and the fourth driving coil 122d may pull the first driving yoke 121a and the second driving yoke 121b in the direction of the arrow, respectively, and accordingly, the movable body 110 may move in the −X-direction. Referring to FIG. 7B, a current may be applied to the second driving coil 122b and the third driving coil 122c such that the second driving coil 122b and the third driving coil 122c may pull the second driving yoke 121b and the third driving yoke 121c in the direction of the arrow, respectively, and accordingly, the movable body 110 may move in the +X-direction. Referring to FIG. 7C, a current may be applied to the first driving coil 122a and the third driving coil 122c such that the first driving coil 122a and the third driving coil 122c may pull the first driving yoke 121a and the third driving yoke 121c in the direction of the arrow, respectively, and accordingly, the movable body 110 may move in the +Y-direction. Referring to FIG. 7D, a current may be applied to the second driving coil 122b and the fourth driving coil 122d such that the second driving coil 122b and the fourth driving coil 122d may pull the second driving yoke 121b and the fourth driving yoke 121d in the direction of the arrow, respectively, and accordingly, the movable body 110 may move in the −Y-direction.

FIGS. 8A to 8D are diagrams illustrating the deformation of a substrate 140 according to the movement of a movable body 110.

Figure 8A:
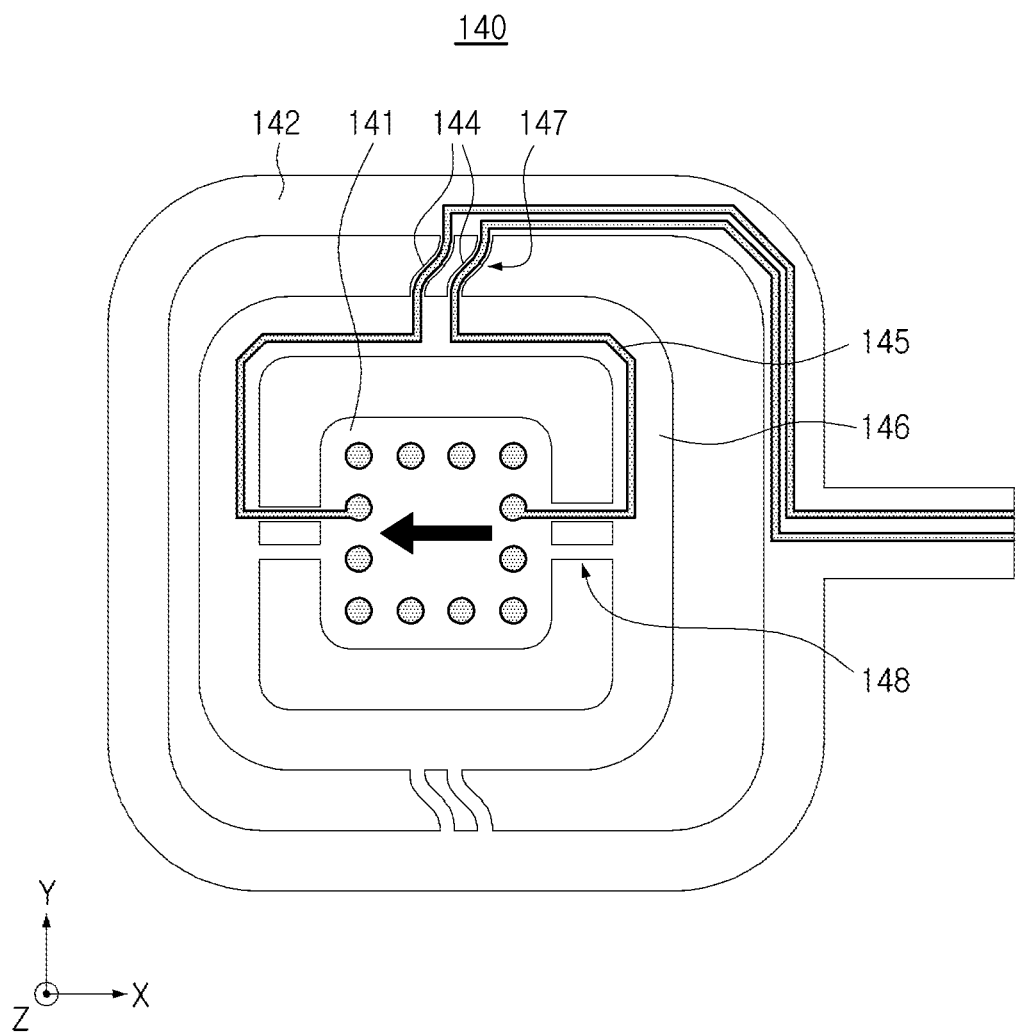
FIGS. 8A to 8D are diagrams illustrating the deformation of a substrate according to the movement of a movable body.

Referring to FIG. 8A, when the movable body 110 moves in the −X-direction, the movable portion 141 of the substrate 140 may also move in the −X-direction, and accordingly, the first bridge 147 connecting the guide 146 to the fixed portion 142 may be deformed. Since the bridge elements 144 included in the first bridge 147 have elasticity, the deformed first bridge 147 may provide a restoring force for allowing the movable portion 141 to return in the direction (the +X-direction) opposite to the moving direction. Accordingly, when no current is applied to the OIS driver 120, the movable portion 141 may move in the −X-direction.

Figure 8B:
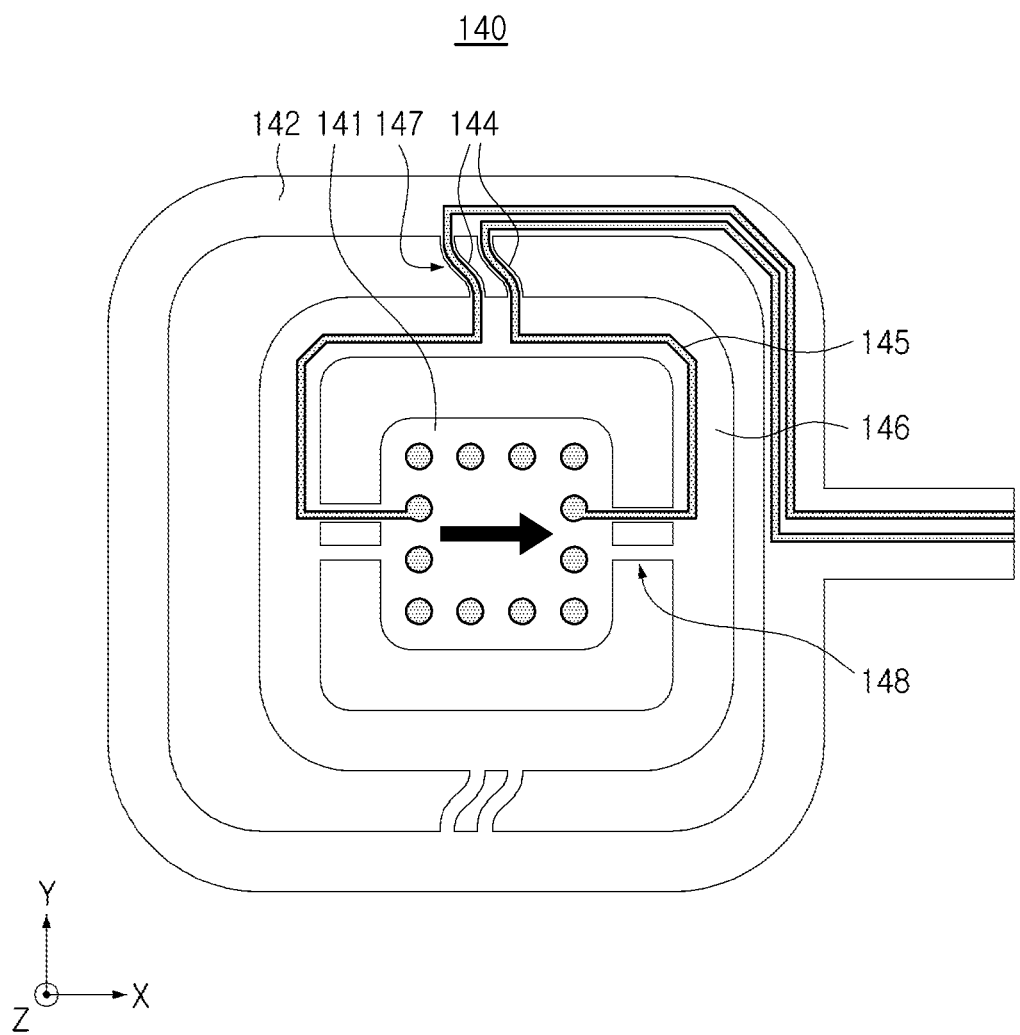

Referring to FIG. 8B, when the movable body 110 moves in the +X-direction, the movable portion 141 of the substrate 140 may also move in the +X-direction, and accordingly, the first bridge 147 connecting the guide 146 to the fixed portion 142 may be deformed. Since the bridge elements 144 included in the first bridge 147 have elasticity, the deformed first bridge 147 may provide a restoring force to allow the movable portion 141 to return in the direction (the −X-direction) opposite to the moving direction.

Figure 8C:
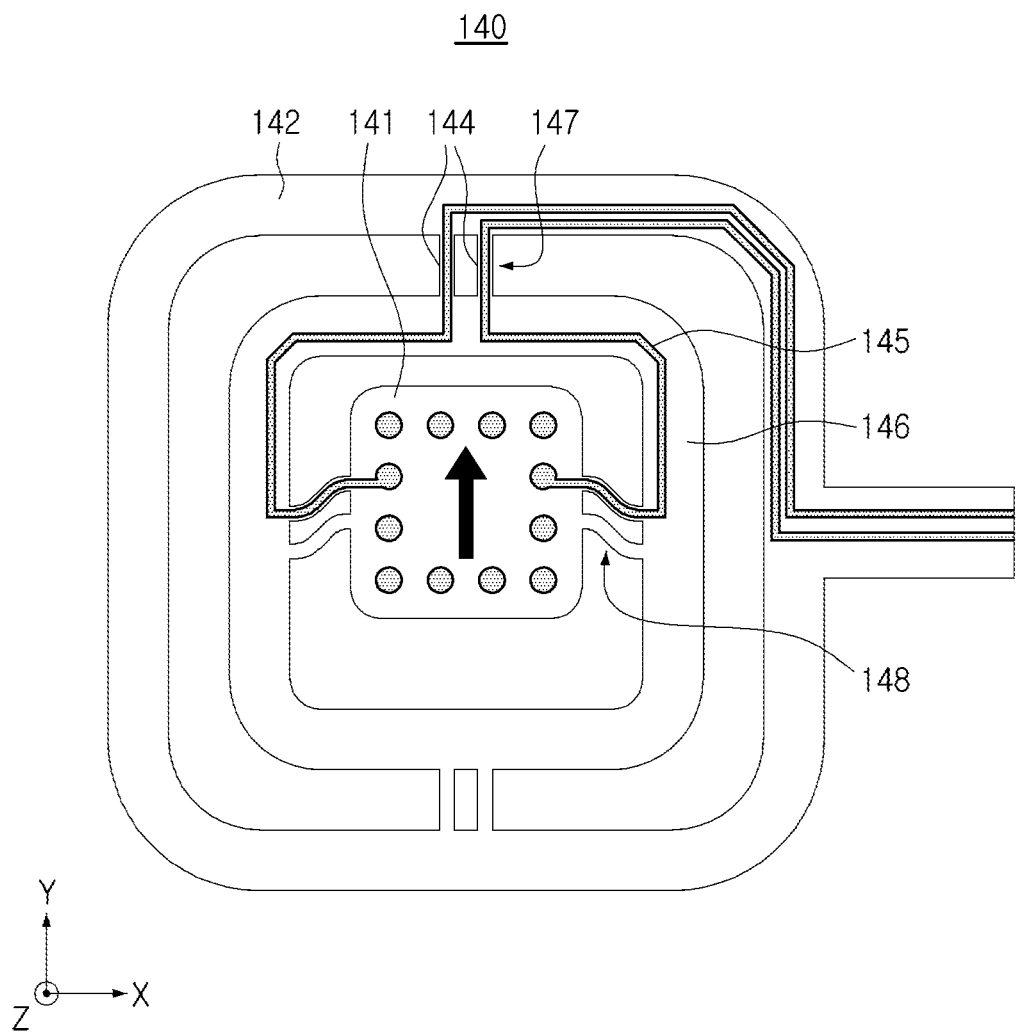

Referring to FIG. 8C, when the movable body 110 moves in the +Y-direction, the movable portion 141 of the substrate 140 may also move in the +Y-direction, and accordingly, the second bridge 148 connecting the guide 146 to the fixed portion 142 may be deformed. Since the bridge elements 144 included in the second bridge 148 have elasticity, the deformed second bridge 148 may provide a restoring force to allow the movable portion 141 to return in the direction (the −Y-direction) opposite to the moving direction.

Figure 8D:
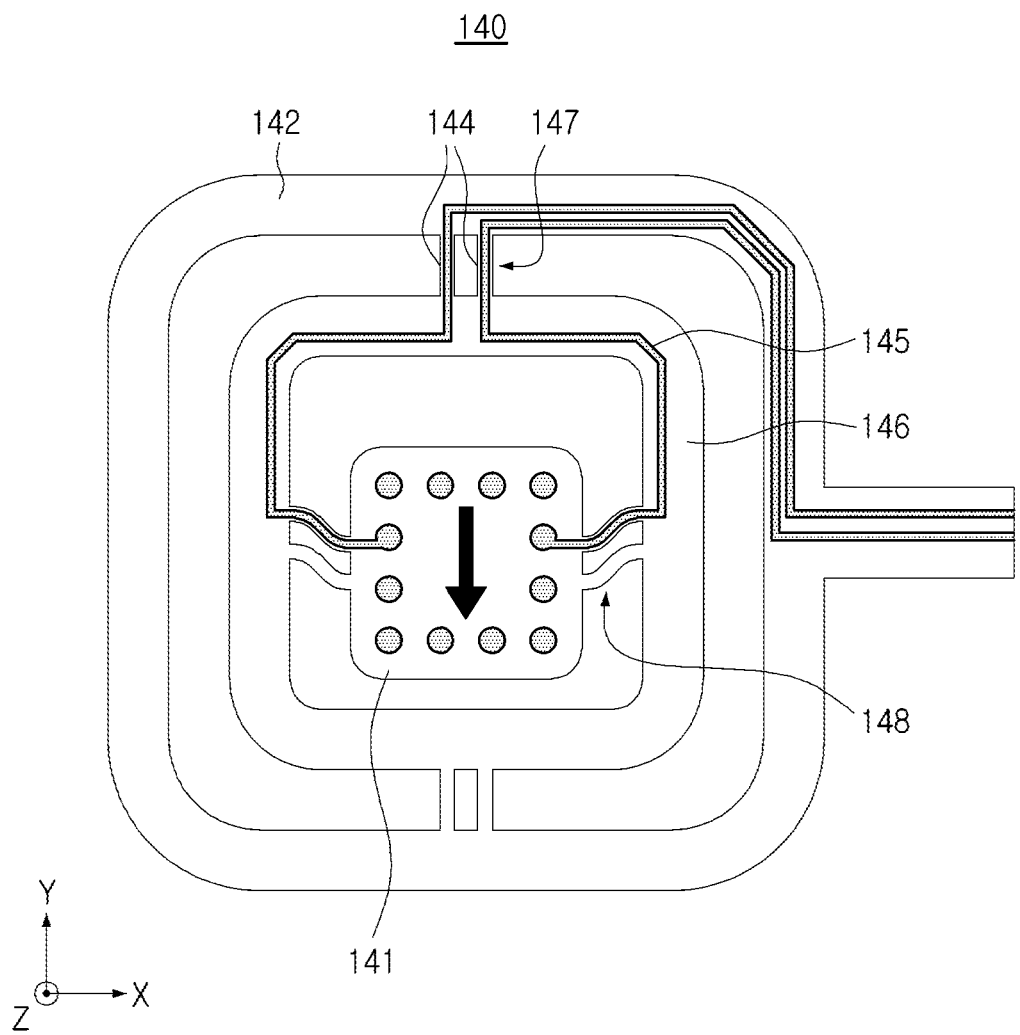

Referring to FIG. 8D, when the movable body 110 moves in the −Y-direction, the movable portion 141 of the substrate 140 may also move in the −Y-direction, and accordingly, the second bridge 148 connecting the guide 146 to the fixed portion 142 may be deformed. Since the bridge elements 144 included in the second bridge 148 have elasticity, the deformed second bridge 148 may provide a restoring force to allow the movable portion 141 to return in the direction (the +Y-direction) opposite to the moving direction.

Figure 9A:
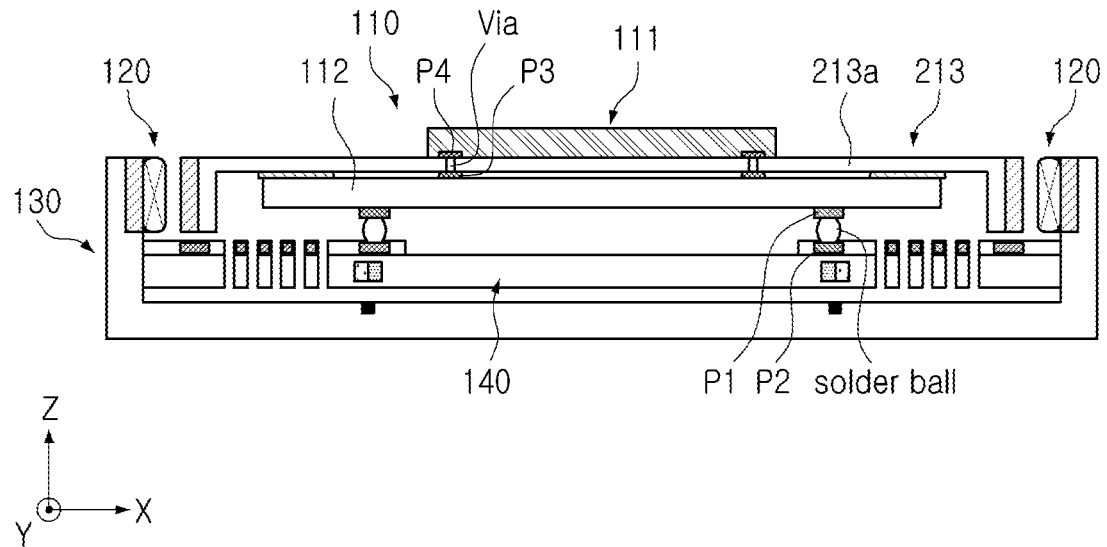
FIGS. 9A and 9B are diagrams illustrating a sensor holder having a form different from the example in FIG. 2A.
Figure 9B:
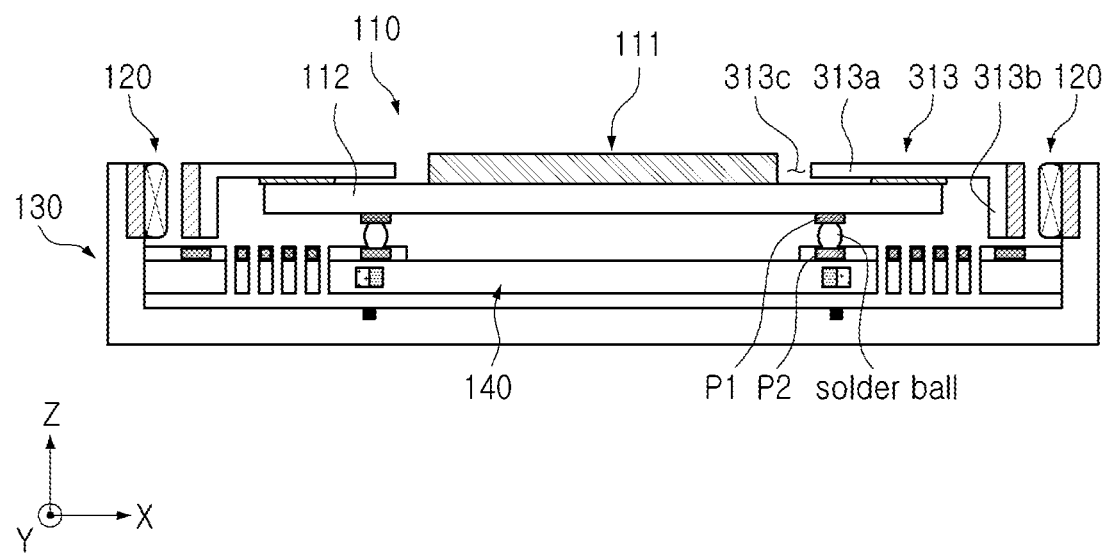

FIGS. 9A and 9B are diagrams illustrating a sensor holder 213 having a form different from the example in FIG. 2A.

Referring to FIG. 9A, the sensor holder 213 may be disposed on the sensor substrate 112. In an example embodiment, the sensor holder 213 may include a plate 213a disposed on the sensor substrate 112 and an extension portion 213b extending downwardly (in the −Z-direction) from the edge of the plate 213a. The extension portion 213b may oppose the driving coil (e.g., the driving coil 122 in FIG. 2) of the OIS driver 120, and the driving yoke (e.g., the driving yoke 121 in FIG. 2) of the OIS driver 120 may be seated on the extension portion 213b. In another example embodiment, the driving yoke may be mounted on the fixed body 130 and the driving coil may be mounted on the sensor holder 213. In this case, the driving coil and/or yoke (e.g., the yoke 123 in FIG. 2) may be seated on the extension portion 213b. As compared to the sensor holder 213 in FIG. 2, the sensor holder 213 in FIG. 9 may be more advantageous in avoiding interference with the solder ball connecting the sensor substrate 112 to the substrate 140. Also, when the sensor holder 213 is disposed on the upper side of the sensor substrate 112, a thickness of the sensor holder 213 may be relatively freely increased, which may improve the mechanical rigidity of the sensor holder 213.

Referring to FIG. 9A, the image sensor 111 may be electrically connected to the sensor substrate 112 through a conductive via.

Referring to FIG. 9B, the sensor holder 313 may be disposed on the sensor substrate 112. In an example embodiment, the sensor holder 313 may include a plate 313a disposed on the sensor substrate 112 and an extension portion 313b extending downwardly (in the −Z-direction) from the edge of the plate 313a. The extension portion 313b may oppose the driving coil (e.g., the driving coil 122 in FIG. 2) of the OIS driver 120, and the driving yoke (e.g., the driving yoke 121 in FIG. 2) of the OIS driver 120 may be seated on the extension portion 313b. In another example embodiment, the driving yoke may be mounted on the fixed body 130, and the driving coil may be mounted on the sensor holder 313. In this case, the driving coil and/or yoke (e.g., the yoke 123 in FIG. 2) may be seated on the portion 313b. As compared to the sensor holder 313 in FIG. 2, the sensor holder 313 in FIG. 9 may be more advantageous in avoiding interference with the solder ball connecting the sensor substrate 112 and the substrate 140. Also, when the sensor holder 313 is disposed on the upper side of the sensor substrate 112, a thickness of the sensor holder 313 may be relatively freely increased, which may improve the mechanical rigidity of the sensor holder 313.

Referring to FIG. 9B, the image sensor 111 may be directly mounted on the sensor substrate 112. Accordingly, the sensor holder 313 may include a through portion 313c in a portion corresponding to the image sensor 111. The image sensor 111 may be seated on the sensor substrate 112, and a terminal of the image sensor 111 and a terminal of the sensor substrate 112 may be connected to each other through wire bonding.

According to the aforementioned example embodiments, the camera may provide effective optical image stabilization with low power. Also, according to an example embodiment, the effect of the magnetic field of the actuator driving the image sensor on the electronic component disposed outside the camera may be eliminated or reduced.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A sensor shifting module, comprising:
   a fixed body;
   a movable body, movably disposed in the fixed body, comprising an image sensor having an imaging plane oriented in a first direction, a sensor substrate coupled to the image sensor, and a sensor holder comprising a plate disposed on an upper side of the sensor substrate and an extension portion extending from an edge of the plate;
   a substrate, connecting the movable body to the fixed body, configured to deform based on a movement of the movable body with respect to the fixed body; and
   a driver, configured to move the movable body in a direction orthogonal to the first direction with respect to the fixed body, comprising a driving coil coupled to one of the fixed body and the movable body, and a driving yoke coupled to another of the fixed body and the movable body,
   wherein the driving coil or the driving yoke is disposed on the extension portion,
   wherein the driving yoke is disposed to oppose the driving coil in the direction orthogonal to the first direction, and
   wherein, when current is applied to the driving coil, the movable body is configured to move in the direction orthogonal to the first direction by electromagnetic interaction between the driving coil and the driving yoke.

2. The sensor shifting module of claim 1, wherein the driving yoke is a soft magnetic material.

3. The sensor shifting module of claim 1, wherein, when no current flows in the driving coil, a magnetic field due to the driving yoke is zero.

4. The sensor shifting module of claim 1, wherein the driving coil and the driving yoke oppose each other in a second direction orthogonal to the first direction, and electromagnetic interaction between the driving coil and the driving yoke is configured to move the movable body in the second direction.

5. The sensor shifting module of claim 1, wherein the driving coil and the driving yoke oppose each other in a second direction orthogonal to the first direction, the driving coil comprises a first driving coil and a second driving coil disposed on both sides of the movable body in the second direction, respectively, and the driving yoke comprises a first driving yoke and a second driving yoke opposing the first driving coil and the second driving coil in the second direction, respectively.

6. The sensor shifting module of claim 1, wherein the driver further comprises a yoke disposed on one side of the driving coil, and the driving coil is disposed between the driving yoke and the yoke.

7. The sensor shifting module of claim 1, wherein the driving coil and the driving yoke oppose each other in a diagonal direction of the image sensor.

8. The sensor shifting module of claim 1, wherein the substrate comprises electrical traces connected to the image sensor.

9. The sensor shifting module of claim 8,
wherein the substrate comprises a movable portion fixedly coupled to the movable body, a fixed portion fixedly coupled to the fixed body, and a supporting portion interconnecting the movable portion and the fixed portion to each other, and
wherein the supporting portion comprises a plurality of bridges comprising the electrical traces embedded therein.

10. The sensor shifting module of claim 9, wherein the supporting portion comprises a guide, disposed between the movable portion and the fixed portion, connected to the movable portion and the fixed portion through the plurality of bridges.

11. The sensor shifting module of claim 10, wherein the plurality of bridges further comprises first bridges extending from the movable portion to the guide in a second direction orthogonal to the first direction, and second bridges extending from the guide to the fixed portion in a third direction orthogonal to the first direction, and
wherein the second direction and the third direction intersect each other.

12. The sensor shifting module of claim 9, wherein the sensor substrate and the movable portion are connected to each other through solder balls at corresponding contact points.

13. The sensor shifting module of claim 1, wherein the driver further comprises a position sensor disposed on one of the fixed body and the movable body, and a sensing magnet disposed on another of the fixed body and the movable body and opposing the position sensor in the first direction.

14. A sensor shifting module, comprising:
a fixed body;
a movable body, movably disposed in the fixed body, comprising an image sensor having an imaging plane oriented in a first direction;
a substrate, connecting the movable body to the fixed body, configured to deform based on a movement of the movable body with respect to the fixed body; and
a driver, configured to move the movable body in a direction orthogonal to the first direction with respect to the fixed body, comprising a driving coil coupled to one of the fixed body and the movable body, and a driving yoke coupled to another of the fixed body and the movable body,
wherein the driving yoke is disposed to oppose the driving coil in the direction orthogonal to the first direction,
wherein, when current is applied to the driving coil, the movable body is configured to move in the direction orthogonal to the first direction by electromagnetic interaction between the driving coil and the driving yoke,
wherein the substrate comprises electrical traces connected to the image sensor,
wherein the substrate comprises a movable portion fixedly coupled to the movable body, a fixed portion fixedly coupled to the fixed body, and a supporting portion interconnecting the movable portion and the fixed portion to each other,
wherein the supporting portion comprises a plurality of bridges comprising the electrical traces embedded therein,
wherein the movable body further comprises a sensor substrate coupled to the image sensor, the sensor substrate is disposed on the movable portion, and the sensor substrate and the movable portion are connected to each other through solder balls at corresponding contact points, and
wherein the movable body further comprises a sensor holder comprising a plate disposed on an upper side of the sensor substrate and an extension portion extending from an edge of the plate, and the driving coil or the driving yoke is mounted on the extension portion.

15. A camera module, comprising:
a lens module comprising a lens; and
a sensor shifting module, comprising:
a fixed body;
a movable body, movably disposed in the fixed body, comprising an image sensor having an imaging plane oriented in a first direction, a sensor substrate coupled to the image sensor, and a sensor holder comprising a plate disposed on an upper side of the sensor substrate and an extension portion extending from an edge of the plate;
a substrate, connecting the movable body to the fixed body, configured to deform based on a movement of the movable body with respect to the fixed body; and
a driver, configured to move the movable body in a direction orthogonal to the first direction with respect to the fixed body, comprising a driving coil coupled to one of the fixed body and the movable body, and a driving yoke coupled to another of the fixed body and the movable body,
wherein the driving coil or the driving yoke is disposed on the extension portion, and
wherein the driving yoke is disposed to oppose the driving coil in the direction orthogonal to the first direction, and
a space between the driving yoke and the driving coil is an air gap.

16. The sensor shifting module of claim 15, wherein the driving yoke is a soft magnetic material.

17. The sensor shifting module of claim 15, wherein the substrate comprises electrical traces connected to the image sensor.

* * * * *